UNITED STATES PATENT OFFICE.

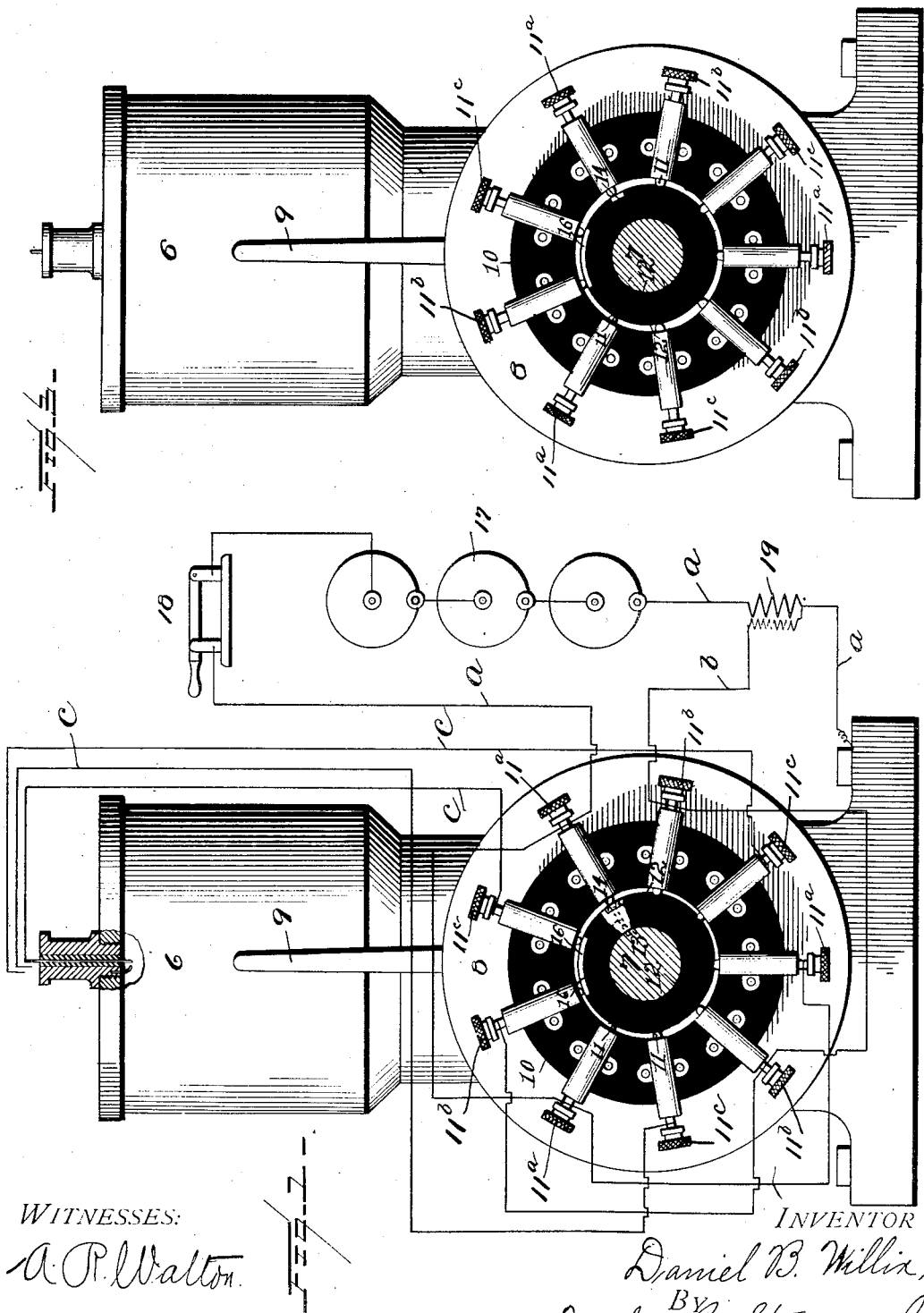

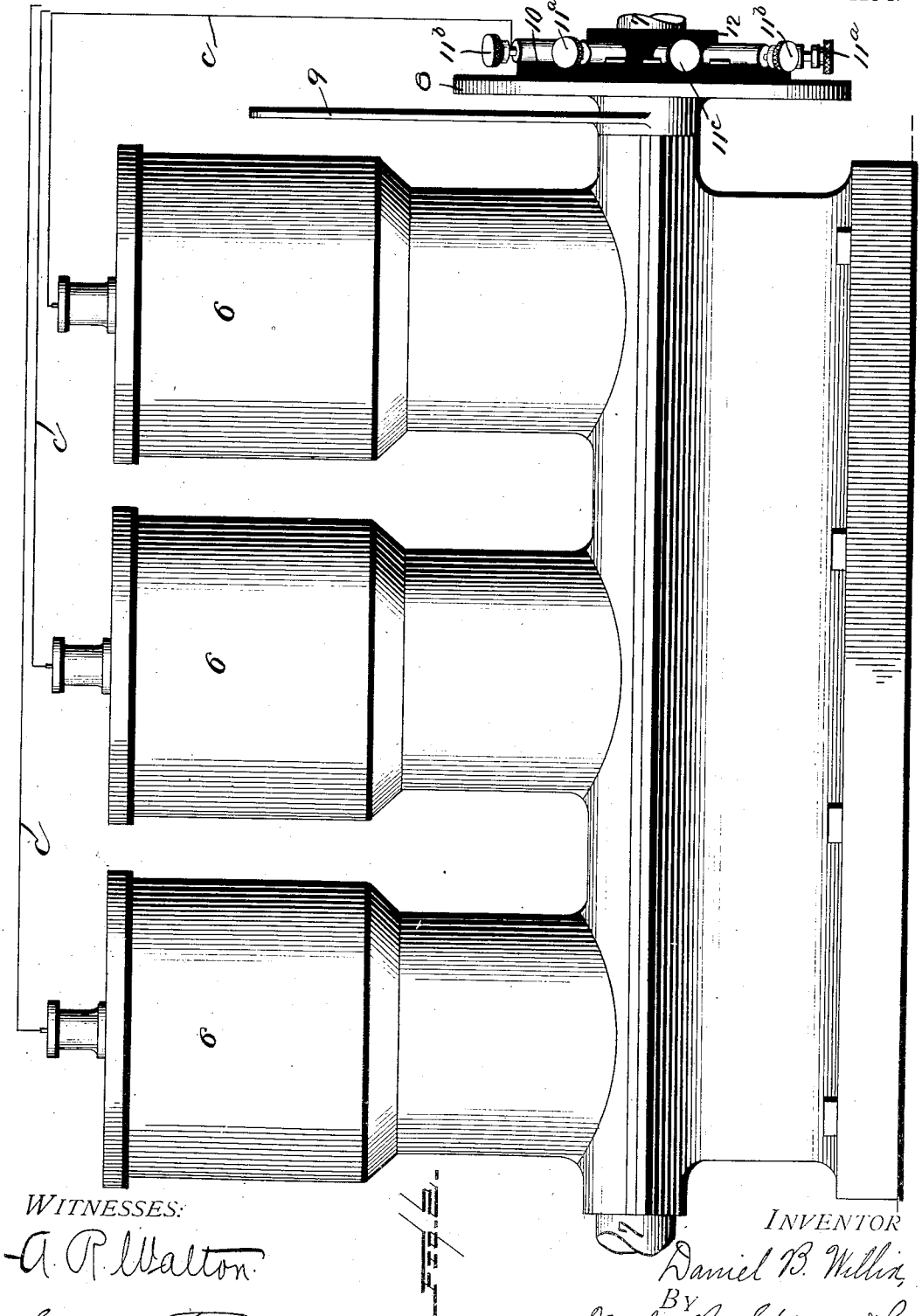

DANIEL BROWER WILLIX, OF ALEXANDRIA BAY, NEW YORK, ASSIGNOR OF ONE-HALF TO GEORGE W. WILLIX, OF ALEXANDRIA BAY, NEW YORK.

CONTROLLER FOR SPARKING DEVICES OF GAS-ENGINES.

No. 811,680.     Specification of Letters Patent.     Patented Feb. 6, 1906.

Application filed April 24, 1905. Serial No. 257,266.

*To all whom it may concern:*

Be it known that I, DANIEL BROWER WILLIX, a citizen of the United States, residing at Alexandria Bay, in the county of Jefferson and State of New York, have invented new and useful Improvements in Controllers for Sparking Devices of Gas-Engines, of which the following is a specification.

This invention is a controller for the sparking devices of explosive-engines.

It consists of a device which is connected directly to the engine-shaft and which by its rotation makes and breaks the primary and secondary circuits of a sparking outfit for one or more engine-cylinders. The device is also capable of adjustment to delay or hasten the explosion, and thus control the speed of the engine, also to reverse the engine, if and when desired.

With this invention only one induction-coil is needed, the same coil supplying the sparking circuit through suitable connections, which are automatically switched from one cylinder to another as the engine-shaft rotates.

The invention is capable of use with either a dynamo or a battery and has further advantages, as will be more fully apparent from the following description.

Referring to the accompanying drawings, Figure 1 is a diagrammatic view showing the controller and its connections. Fig. 2 is a side elevation of an engine with the device applied thereto. Fig. 3 is an end elevation of the same.

The controller comprises a multiple switch which controls the primary circuit of an induction-coil and also the secondary circuits which connect with the sparking plugs.

Referring specifically to the drawings, 6 indicates a series of engine-cylinders, and 7 the main shaft of the engine.

8 is a disk mounted to turn upon the main shaft and controlled by an adjusting and reversing lever 9, attached thereto. Fixed to the plate 8 is a ring 10, of insulating material, carrying a series of copper contact-brushes 11. In the embodiment shown there are three cylinders and three sets of brushes, each set consisting of three brushes, two of which are connected in the secondary circuit and the other of which is connected in the primary circuit, as more fully described hereinafter.

12 indicates a collar, of rubber or other insulating material, which is fixed to the shaft 7 by a set-screw 13, which also forms a conducting connection to the shaft from a contact-plate 14 on the periphery of the collar. The collar is also provided on its periphery with a contact-plate 16. The plate 14 contacts with but one post at a time, and the primary circuit is closed therethrough. The plate 16 is long enough to lap and connect two of the posts 11, and thereby close the secondary circuit to one of the cylinders.

Referring particularly to Fig. 1, the primary circuit $a$ extends from the batteries 17 through a hand-switch 18 to what I will designate as "primary" posts $11^a$. There are three of these posts, as shown, corresponding in number to the number of cylinders. The other side of the circuit extends from the battery through the induction-coil 19 and is grounded to the engine. The secondary circuit $b$ extends from the induction-coil to three other posts $11^b$. The sparking plug of each engine is connected by a separate wire $c$ to a post $11^c$. These plugs are all arranged alternately in a series around the ring 12, on which they are supported, so that when the primary circuit through one of the posts $11^a$ is closed by contact of the plate 14 with said post the secondary circuit is closed by means of the plate 16, connecting one of the posts $11^b$ and one of the posts $11^c$. There is thus as the shaft of the engine revolves a making and breaking of the circuits, and consequently the production of the spark in the successive engine-cylinders.

By means of the lever 9 the plate 8 and the contact-posts carried thereby may be shifted to delay or hasten the spark or to stop or reverse the engine.

The sets of posts around the shaft may be varied according to the number of cylinders, the device being capable of application, with slight variation in the proportion of the parts, to as many or as few cylinders as are desired.

The construction has the advantage that the device which controls the circuits is directly connected to the shaft and there is an absence of gears and rods.

What I claim as new, and desire to secure by Letters Patent, is—

1. In a gas-engine or the like, means for controlling the current to the igniters, comprising a set of contact-terminals for each igniter, each set consisting of a contact-terminal connected in a primary circuit of an induction-coil, and contact-terminals connected in the secondary circuit of the coil and to the igniter, all of said contacts being arranged in a single row, and means operating with the main shaft of the engine to close said contacts.

2. In a gas-engine or the like, means for controlling the current to an igniter, comprising a source of electricity, and an induction-coil in primary circuit therewith, the circuit having contacts, a secondary circuit connected to the igniter and having contacts, and means actuated by the engine to close said contacts, comprising a series of brushes arranged to brush successively over all of said contacts.

3. In a gas-engine or the like, means for controlling the current to a plurality of igniters, comprising a source of electricity, an induction-coil in primary circuit therewith, the circuit having contacts, a secondary circuit having contacts corresponding in number to the igniters and separate connections therefrom to the igniters respectively, all of said contacts being arranged in a single row, and means actuated by the engine to successively close said contacts.

4. In a gas-engine or the like, means for controlling the current to the igniters, comprising, in combination, a plurality of sets of brushes arranged in a single row around a shaft of the engine, the sets corresponding in number to the igniters, each set having a brush in the primary circuit of an induction-coil and a pair of brushes in the secondary circuit, and contacts carried by the shaft and revolving under said brushes and adapted to close the respective circuits.

5. In a gas-engine or the like, means for controlling the current to the igniters, comprising, in combination, a single shiftable ring extending around a shaft of the engine; a series of sets of brushes arranged in a single row—one set for each igniter—carried by the ring, each set having a brush in the primary circuit of an induction-coil, and a pair of brushes in a secondary circuit of the coil connected to an igniter; and contacts carried by the shaft and revolving therewith across the brushes, one of said contacts being a terminal in the primary circuit and the other being a connector to connect said pair of brushes.

In testimony whereof I have signed my name to this specification in the presence of two subscribing witnesses.

DANIEL BROWER WILLIX.

Witnesses:
JOHN W. PAYNE,
WALTER WELLER.